(12) United States Patent
Guerras

(10) Patent No.: US 11,910,910 B1
(45) Date of Patent: Feb. 27, 2024

(54) COMBINATION TOOTHBRUSH AND TOOTHPASTE DISPENSER

(71) Applicant: Safiah Guerras, Riyadh (SA)

(72) Inventor: Safiah Guerras, Riyadh (SA)

(*) Notice: Subject to any disclaimer, the term of this patent is extended or adjusted under 35 U.S.C. 154(b) by 0 days.

(21) Appl. No.: 18/313,582

(22) Filed: May 8, 2023

(51) Int. Cl.
 A46B 11/00 (2006.01)
 A61C 15/04 (2006.01)

(52) U.S. Cl.
 CPC ...... *A46B 11/0006* (2013.01); *A46B 11/0037* (2013.01); *A46B 11/0075* (2013.01); *A46B 11/0089* (2013.01); *A46B 2200/1066* (2013.01); *A61C 15/04* (2013.01)

(58) Field of Classification Search
 CPC ............ A46B 11/0006; A46B 11/0037; A46B 11/0075; A46B 11/0089; A46B 2200/1066; A61C 15/04
 See application file for complete search history.

(56) References Cited

U.S. PATENT DOCUMENTS

| | | | | |
|---|---|---|---|---|
| 1,049,863 A | * | 1/1913 | Happle | A46B 11/0041 401/269 |
| 2,536,968 A | | 1/1951 | Tirocchi | |
| 2,922,178 A | * | 1/1960 | Kelly | A46B 11/0041 401/290 |
| 4,036,412 A | | 7/1977 | Craig | |
| 4,116,570 A | | 9/1978 | Parenti | |
| 4,332,497 A | * | 6/1982 | Rodriguez | A46B 17/04 401/184 |
| 4,622,984 A | | 11/1986 | Gaebel | |
| D294,433 S | | 3/1988 | DeMars | |
| 4,796,783 A | | 1/1989 | Paulson | |
| 4,826,341 A | | 5/1989 | Kwak | |
| 4,991,989 A | | 2/1991 | Fitjer | |
| 5,028,158 A | | 7/1991 | Fey | |
| 5,415,187 A | | 5/1995 | Heneveld | |
| D366,960 S | | 2/1996 | Crimi | |
| D402,473 S | | 12/1998 | Robertson | |
| D402,812 S | | 12/1998 | Goff | |
| 6,009,886 A | * | 1/2000 | Labranche | A46B 11/0027 401/175 |
| 6,129,090 A | | 10/2000 | Pillar | |
| D443,143 S | | 6/2001 | Ponceano | |
| 6,390,103 B1 | | 5/2002 | Manso | |
| 7,011,467 B1 | | 3/2006 | Fiore | |
| 7,128,492 B1 | | 10/2006 | Thames, Jr. | |

(Continued)

FOREIGN PATENT DOCUMENTS

| | | |
|---|---|---|
| CA | 1027312 | 3/1978 |
| GB | 2323779 | 10/1998 |

(Continued)

*Primary Examiner* — Laura C Guidotti
*Assistant Examiner* — Aaron R McConnell
(74) *Attorney, Agent, or Firm* — Cislo & Thomas, LLP

(57) ABSTRACT

A toothbrush configured to dispense toothpaste and dental floss, the toothbrush having a handle, a head, and a chamber defined by the handle and the head into which toothpaste can be inserted directly or in a tube. The head of the toothbrush defines a hole and the handle is configured to dispense the toothpaste through the hole and onto bristles on the head of the toothbrush. A cap can be provided to cover the bristles. The cap can also include a spike that is used to puncture a hole in a tube of toothpaste or to plug the hole when not in use.

8 Claims, 4 Drawing Sheets

(56) References Cited

U.S. PATENT DOCUMENTS

| | | | |
|---|---|---|---|
| 7,913,883 B1 | 3/2011 | Kaufman | |
| 9,907,391 B2 | 3/2018 | McCoy | |
| 10,342,325 B2 | 7/2019 | Moskovich | |
| 10,499,726 B2 | 12/2019 | Moskovich | |
| 11,019,917 B2 | 6/2021 | Ferzli | |
| 2003/0086745 A1 | 5/2003 | Micaletti | |
| 2004/0237995 A1 | 12/2004 | Mualem | |
| 2005/0268935 A1* | 12/2005 | Hoffecker | A46B 17/04 132/309 |
| 2006/0254610 A1* | 11/2006 | Chen | A61C 15/046 132/325 |
| 2007/0000941 A1 | 1/2007 | Hadden | |
| 2011/0239388 A1* | 10/2011 | Lee | A46B 11/0089 15/104.94 |
| 2012/0085778 A1 | 4/2012 | Fallacara | |
| 2016/0141853 A1 | 5/2016 | Findley | |
| 2019/0116968 A1 | 4/2019 | Curry | |
| 2022/0079726 A1* | 3/2022 | White | A46B 15/0071 |

FOREIGN PATENT DOCUMENTS

| | | |
|---|---|---|
| GB | 2329110 | 3/1999 |
| GB | 2390014 | 12/2003 |
| JP | 2006341036 | 12/2006 |
| JP | 3891924 | 3/2007 |
| WO | WO 2016141853 | 9/2016 |

\* cited by examiner

COMBINATION TOOTHBRUSH AND TOOTHPASTE DISPENSER

FIELD OF THE INVENTION

The present invention is directed towards toothbrushes and toothpaste dispensers, and in particular, the combination of a toothbrush with a toothpaste dispenser, and optionally a dental floss holder.

BACKGROUND OF THE INVENTION

It is desirable for travelers to minimize items they carry so as to reduce luggage size and weight, including toiletries. In general, travelers will bring a toothbrush and toothpaste as separate items. Some will bring dental floss, while others will forget. Although travel size toothpastes exist, the toothpaste and toothbrush are typically two separate items. Oftentimes, the traveler will end up bringing a full size toothpaste.

The toothpaste also has a cap that has to be removed in order to dispense the toothpaste. This extra step may be a minor inconvenience for typical travelers, but can be a bigger nuisance for those who may have a disability with one of their hands.

As such, there is a need for an improved and more efficient toothbrush that packages dental hygiene items into a single item that is easy to use, even for those who may be limited to one hand.

SUMMARY OF THE INVENTION

The invention of the present application is directed towards a toothbrush with a toothpaste dispenser incorporated therein, and optionally, and a dental floss holder. The toothbrush with toothpaste and dental floss is shown above. The toothpaste is contained in the handle between the lower housing and a flexible piece of film that is welded along its edges around the seam between the upper housing and the lower housing. The toothpaste chamber is completely sealed between the flexible film and the lower housing until the cap is placed over the bristles. A spike protruding from the cap then pierces the flexible film, which allows the toothpaste to flow out of the toothpaste chamber through the hole that has been created in the flexible film. When the slider is moved towards the bristles, the film is depressed by an internal bumper and is forced towards the bristles. When the cap is replaced back over the bristles, the spike protrudes into the toothpaste port and prevents additional toothpaste from flowing out of the toothpaste chamber.

A bristle cap comprises a lower cap and an upper cap. A floss spool is located inside the bristle cap between the bristle compartment and the handle of the toothbrush. The floss spool is separated from the toothbrush bristles by a waterproof barrier that prevents water on the bristles from contaminating the dental floss contained on the floss spool. The dental floss passes through a rubber O-ring that is sandwiched between the upper cap and the lower cap. The O-ring prevents water from flowing into the floss compartment and contaminating the dental floss. A flat removable spacer may be placed between the cap and the toothbrush during shipping to prevent the spike from piercing the flexible film. The spacer may be a sheet of cardboard with a written message on it.

DESCRIPTION OF THE INVENTION

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

Figure 1:
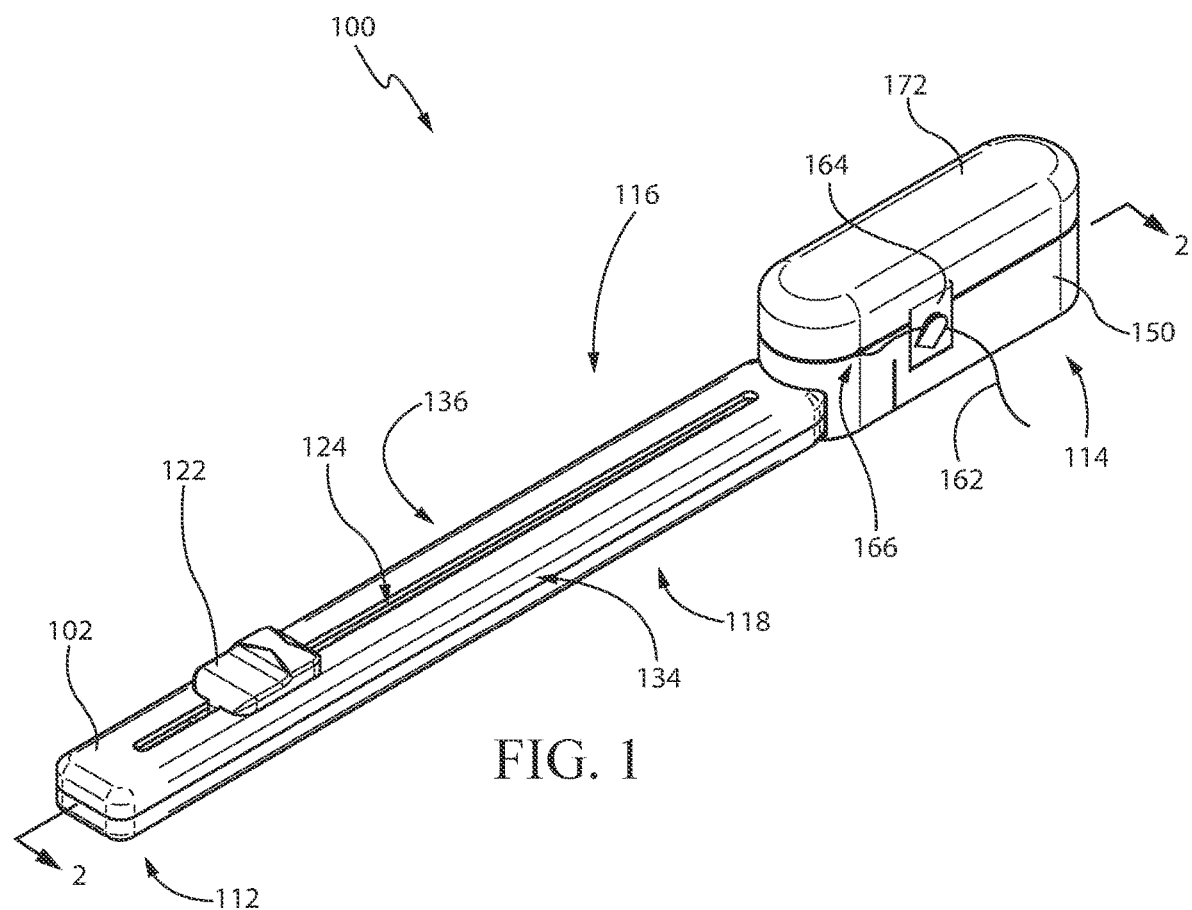
FIG. 1 is a perspective view of an embodiment of the present invention.
Figure 2:
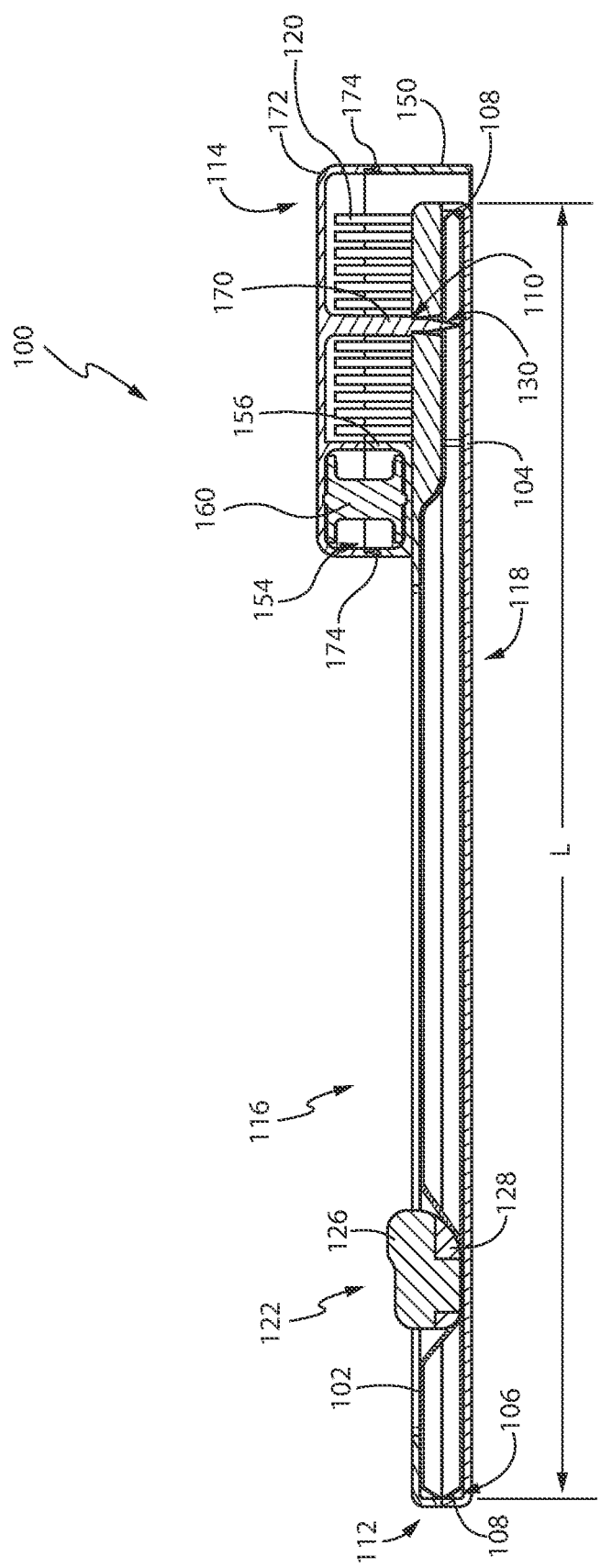
FIG. 2 is a cross section view taken along line 2-2 in FIG. 1.
Figure 3:
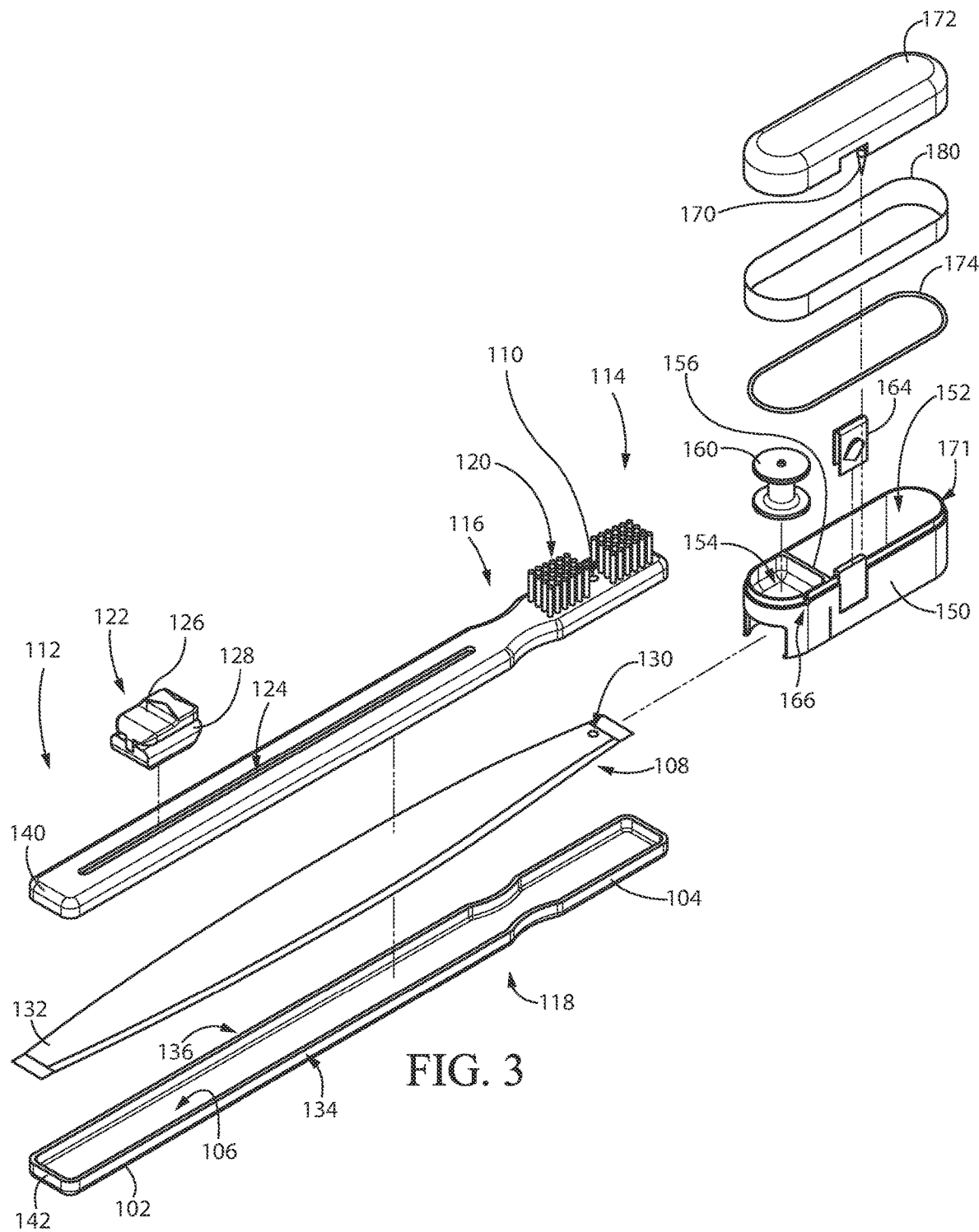
FIG. 3 is an exploded view of an embodiment of the present invention.

With reference to FIGS. 1-3, the invention of the present application is directed towards a toothbrush 100 with toothpaste dispenser, the toothbrush 100 comprising a handle 102 and a head 104, wherein the handle 102 and the head 104 define a chamber 106 in which a tube 108 of toothpaste can be housed. The head 104 comprises a hole 110 that aligns with a hole 130 created in the tube 108 of toothpaste upon first use, such that when the tube 108 of toothpaste is squeezed, toothpaste from within the tube 108 passes out of the hole 130 of the tube 108, and through the hole 110 in the head 104 of the toothbrush 100.

The toothbrush 100 comprises a proximal end 112, a distal end 114 opposite the proximal end 112, a top side 116 in between the proximal end 112 and the distal end 114, and a bottom side 118 opposite the top side 116 and in between the proximal end 112 and the distal end 114. The handle 102 is positioned at the proximal end. As such, at least a portion of the handle 102 can define the proximal end 112 as that is the end that is proximal to the user when held for use.

The head 104 is operatively connected to the handle 102 at the distal end 114. As such, at least a portion of the head 104 can define the distal end 114. The handle 102 and the head 104 define a length L of the toothbrush 100 from the proximal end 112 to the distal end 114. The head 104 can be operatively connected to the handle 102 by being attached to the handle 102 or by being integrally formed with the handle 102. In the preferred embodiment, the handle 102 is integrally formed with the head 104. The handle 102 and the head 104 define a chamber 106 configured to receive the tube 108 of toothpaste. In the preferred embodiment, the tube 108 of toothpaste extends the full length L of the toothbrush 100 from the handle 102 at the proximal end 112 into the head 104 at the distal end 114. The head 104 defines a hole 110 in fluid communications with the chamber 106. As such, when the tube 108 of the toothpaste is punctured adjacent the hole 110 of the head 104 and then squeezed, the toothpaste inside the tube 108 passes through the hole 110 in the head 104 an onto the bristles 120.

Figure 4:
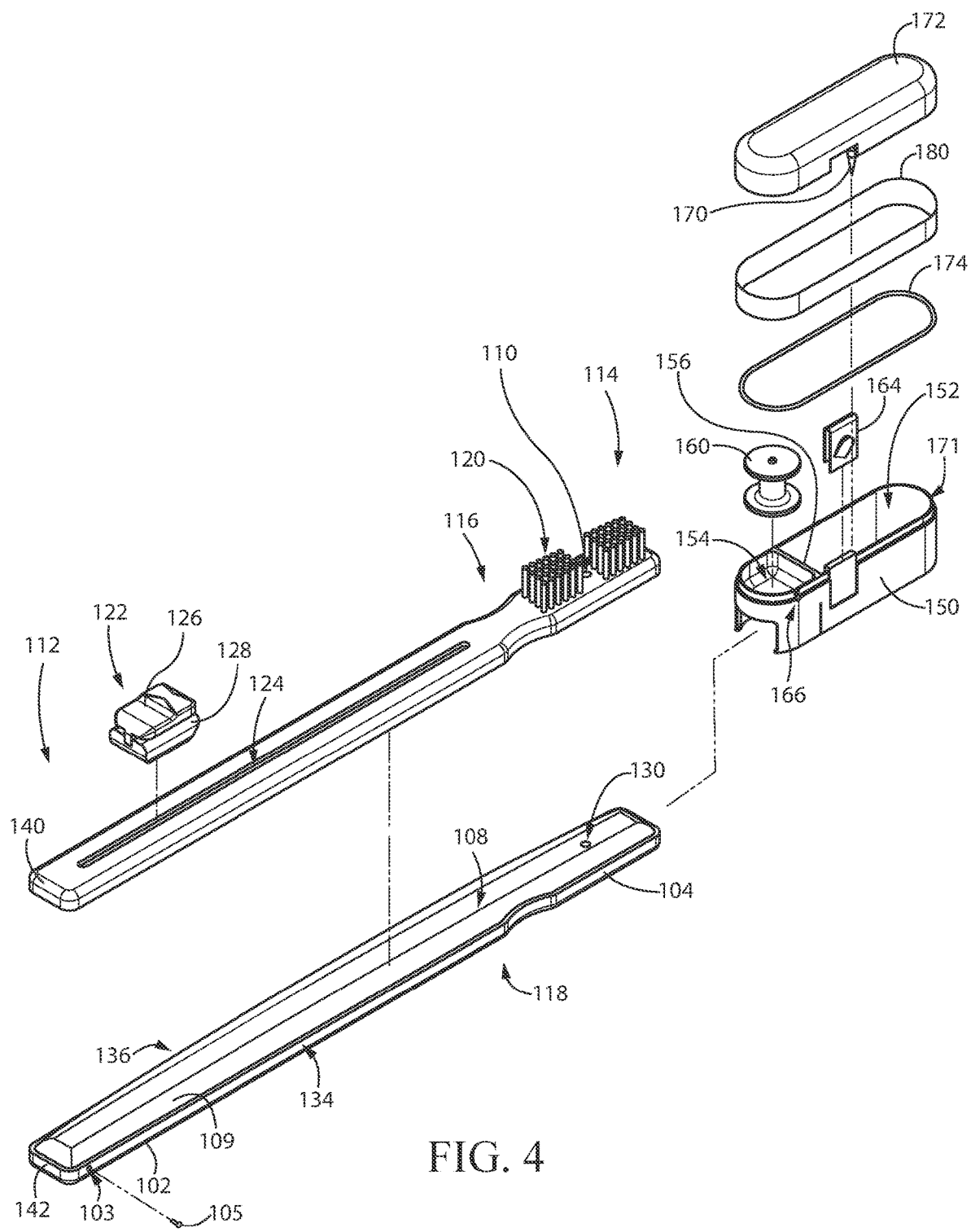
FIG. 4 is an exploded view of another embodiment of the present invention.

A plurality of bristles 120 can project from the head 104 on the top side 116 of the toothbrush 100 like a standard toothbrush. In the present invention, the bristles 120 surround the hole 110 in the head 104 of the toothbrush 100. FIG. 4 does not show bristles lateral to the hole 110 so that the hole 110 can be seen. In the preferred embodiment, bristles 120 can surround the hole 110 on all sides. Preferably, the hole 110 is located approximately at the center of the head 104 for generally even distribution of the toothpaste onto the bristles 120. The hole 110 can also be placed anywhere else on the top side 116 of the head 104 because the brushing action will eventually spread the toothpaste all over the bristles 120.

To expel the toothpaste from the tube 108, in some embodiments, a dispenser 122 can be mounted on the handle 102 and configured to move back and forth longitudinally along the handle 102 in a direction from the proximal end 112 towards the distal end 114 (and back). For example, the handle 102 can have an elongated slit 124. The dispenser 122 can comprise a slider 126 that resides sufficiently on the outside of the handle 102 to be accessible by the user, and a bumper 128 operatively connected to the slider 126 through the slit 124 that is housed inside the chamber 106. The bumper 128 abuts against the tube 108. A hole 130 can be created in the tube 108 adjacent to the hole 110 in the head 104. As the slider 126 is advanced along the slit 124 on the handle 102, the bumper 128 squeezes the tube 108 in the direction towards the head 104. The toothpaste inside the tube 108 follows the path of least resistance, which is through the hole 130 in the tube 108, which leads to the hole 110 in the head 104 an onto the bristles 120.

To keep the tube 108 stationary as the bumper 128 rides along the tube 108, the tube 108 can have a seam 132. The seam 132 can be at the proximal end 112, the distal end 114, the lateral sides 134, 136, or any combination thereof, including along the entire perimeter of the tube 108. By creating a seam 132 along the perimeter edges of the tube 108, the seam 132 can be attached to the handle 102 and/or head 104 without inadvertently squeezing the tube 108.

For example, in some embodiments, the handle 102 (and head 104) can comprise an upper housing 140, and a lower housing 142. The upper housing 140 can be removably connected to the lower housing 142. The tube 108 can be configured to fit inside the chamber 106 in a manner that allows the seam 132 of the tube 108 to extend out far enough to be sandwiched (pinched) between the upper housing 142 and the lower housing 144. The sandwiched seam 132 then prevents the tube 108 as a whole from generally moving in the distal direction as the dispenser 122 is moved towards the distal end 114. The tube 108 can be secured inside the handle 102 and head 104 in other ways, such as by using locating pegs, clips, hooks, and the like that can secure the seam 132.

Other embodiments for squeezing the tube 108 to expel the toothpaste onto the bristles have also been contemplated. For example, in some embodiments the top side 116 or the bottom side 118 of the handle 102 may be pliable. Rather than running a dispenser 122 along the handle 102, the user can simply squeeze the pliable portion of the handle 102. In such an embodiment, the pliable portion of the handle 102 can be made of any kind of flexible film 109. The flexible film 109 is to be interpreted broadly to include any kind of pliable material that can contain toothpaste, such as plastic, rubber, polyethylene, plastic laminates, such as those used in typical squeezable toothpaste containers, and the like. In such embodiments, a sliding dispenser 122 and replaceable tube 108 may not be required, but still can be used. As such, the toothbrush 100 can be disposed of after the toothpaste has run out. Preferably, the pliable portion is on the top side 116 of the handle 102 and the bottom side 118 of the handle 102 is rigid, as shown in FIG. 4.

In some embodiments, the flexible piece of film 109 can be operatively connected to the lower housing 142 by being integrally formed or attached with the lower housing 142, and optionally, the upper housing 140. For example, the film 109 can be attached along its edges around the seam between the upper housing 140 and/or the lower housing 142. FIG. 4 shows the film welded along the perimeter edge of the lower housing 142. The toothpaste chamber 106 is completely sealed between the flexible film 109 and the lower housing 142. When the cap 150 is placed over the bristles 120. The spike 170 protruding from the cap 150 then pierces the flexible film 109, which allows the toothpaste to flow out of the toothpaste chamber 106 through the hole 130 that has been created in the flexible film 109. When the dispenser 122 is moved towards the bristles 120, the film 109 is depressed by an internal bumper 128 and is forced towards the bristles 120. The film 109 can be a portion of the tube 108. As such, in some embodiments, the film 109 can be folded and sealed to create the tube 108 and function as the tube 8 discussed above.

When empty, the film 109 is loose and rests on the floor of the lower housing 142 with the edges of the film 109 sealed against the lower housing 142. The lower housing 142 can have an opening 103 through which toothpaste can be injected into the lower housing 142. Filling the lower housing 142 with toothpaste causes the film 109 to rise and fill the chamber 106 created in between the film 109 and the lower housing 142. As such, the chamber 106 into which the toothpaste is housed can be defined by the space between the lower housing 142 and the film 109. A plug 105 can be used to close the opening 103 after filling with toothpaste. The plug 105 can be any kind of a stopper or cap to prevent backflow of the toothpaste when pressure is applied to the film 109. The upper housing 140 can be placed on top of the film 109 and connected to the lower housing 142 to seal the film 109 and toothpaste inside.

The toothbrush 100 further comprises a cap 150. The cap 150 has multiple functions. For example, the cap 150 can be used to cover the bristles 120, the cap 150 can be used to house dental floss 162, and the cap can be configured to puncture a hole 130 in the tube 108. As such, in the preferred embodiment, the cap 150 defines a first compartment 152 configured to receive the head 104 and the bristles 120. In some embodiments, the cap 150 can further define a second compartment 154 adjacent to the first compartment 152. For example, the cap 150 can comprise a barrier 156 that separates the cap 150 into a first compartment 152 and a second compartment 154 adjacent to the first compartment 152.

In some embodiments, the toothbrush 100 can further comprise a floss spool 160. While the head 104 and bristles 120 can occupy the first compartment 152 of the cap 150, the floss spool 160 can be mounted in the second compartment 154. Dental floss 162 can be wrapped around the floss spool 160 and drawn out from the cap 150 as necessary. As such, the toothbrush 100 can further comprise a floss cutter 164. Preferably, the floss cutter 164 is mounted on the cap 150 adjacent to the floss spool 160. The cap 150 can define an exit port 166 configured for extracting the dental floss 162 out from the cap 150.

To puncture the hole 130 in the tube 108, the cap 150 can comprise a spike 170 projecting into the first compartment 152 and configured to enter the hole 110 of the head 104 when the cap 150 is placed on the head 104. As such, the cap 150 may comprise a ceiling from which the spike 170 descends into the chamber 106. In the preferred embodiment, the cap 150 has an open top 171. The toothbrush 100 can further comprise a removable lid 172 to cover the open top 171. In such an embodiment, the spike 170 can be mounted on the removable lid 172. In embodiments with a removable lid 172, the toothbrush 100 can further comprise a gasket 174 configured to be sandwiched between the removable lid 172 and the cap 150 to create a water tight seal around the second compartment 154. As such, the gasket can be an o-ring, a grommet, or any other type of sealer made from material such as silicone, rubber, plastic, and the like. The gasket 174 can be configured to allow the dental floss 162 to pass through the exit port 166.

In some embodiments, the toothbrush 100 can further comprise a spacer 180 configured to be positioned between the lid 172 and the cap 150 to create a distance between the cap 150 and the lid 172 sufficient to prevent the spike 170 on the lid 172 from entering the hole 110 in the head 104. The spacer 180 is particularly useful when the toothbrush 100 is being transported or stored and the tube 108 of toothpaste is brand new (i.e. without hole 130). Then the tube 108 of toothpaste is not prematurely opened.

In use, the user can discard the spacer 180 in the embodiment with a lid 172 by removing the lid 172 from the cap 150, then removing the spacer 180. Upon replacing the lid 172 back on the cap 150, in the absence of the spacer 180, the spike 170 on the lid 172 enters the hole 110 on the head 104 of the toothbrush 100 and punctures the tube 108 to create a hole 130 in the tube 108 directly adjacent to the hole 110 on the head 104. The user can then remove the lid 172 and the cap 150. The user can then slide the dispenser 122 at the proximal end 112 slightly towards the distal end 114 by pushing on the slider 126. Doing so causes the bumper 128 of the dispenser 122 to squeeze the tube 108. The toothpaste inside the tube 108 follows the path of least resistance, which would be through the hole 130. Pressure at the proximal end 112 of the tube 108 may cause the distal end 114 to bulge making the hole 130 in the tube 108 contiguous with the hole 110 in the head 104. As such, the toothpaste flows from the tube 108 out onto the head 104 of the toothbrush and into the bristles 120. The user can brush his or her teeth, and if more toothpaste is needed, simply slide the dispenser 122 even further closer to the distal end 114.

Upon completion of brushing, the cap 150 is placed back on the head 104 of the toothbrush 100 to cover the bristles 120. The spike 170 enters the hole 110 in the head 104, and can even enter into the hole 130 in the tube 108 to block excess toothpaste from being dispensed when the user is not brushing his or her teeth. As such, the spike 170 functions as a plug to prevent toothpaste from continuing to exit onto the bristles 120.

To floss the teeth (before or after brushing), dental floss 162 on the floss spool 162 can be pulled slightly to extend out from the exit port 166. The lid 172 can be returned back on the cap 150. The user can pull the dental floss 162 and cut the floss 162 on the floss cutter 164 and floss his or her teeth.

The toothbrush 100 of the present invention can be made using typical manufacturing process including using molds, extrusion techniques, 3-D printing, and the like. The invention can be made disposable so that the toothbrush 100 can be disposed of within a short period of time, such as a one- or two-week vacation. The invention can also be made for long term use with quality and sturdy material. In such an embodiment, only the tube 108 is disposed of and the handle 102 can be used long term for in the home. As such, when the toothpaste runs out, the tube 108 is removed and discarded, and a new tube 108 of toothpaste can be inserted into the same handle 102. In disposable embodiments, the materials used are preferably recyclable, biodegradable, or any other environmentally-friendly material, or any combination thereof.

The configuration of the present invention allows all of the important items for dental hygiene to be kept in a single toothbrush 100. As such, the this all-in-one (or three-in-one) toothbrush 100 is the ideal dental hygiene companion for travelers. Therefore, hotels, motels, resorts, airbnb's, cruise ships, and the like, can include the present invention as one of the perks of staying at their location. Alternatively, the toothbrush can be sold in airports, hotels, vending machines, pharmacies, convenient stores, as well as regular retail stores, and any other channel of sale.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

What is claimed is:

1. A combination toothbrush and toothpaste dispenser, comprising:
   a) a proximal end, a distal end opposite the proximal end, a top side in between the proximal end and the distal end, and a bottom side opposite the top side and in between the proximal end and the distal end;
   b) a handle comprising an upper housing defining at least a portion of the proximal end and the top side, and a lower housing defining at least a portion of the proximal end and the bottom side, the lower housing operatively connected to the upper housing and defining a first chamber;
   c) a head operatively connected to the handle opposite the proximal end, the head defining the distal end, and a second chamber, wherein the first chamber and second chamber are in fluid communication, wherein the head defines a hole in fluid communications with the second chamber, wherein the handle and the head define a length of the toothbrush from the proximal end to the distal end;
   d) bristles projecting from the head on the top side, the bristles surrounding the hole;
   e) a tube configured to extend substantially the length of the toothbrush, wherein the tube is configured to be housed in the handle and the head, the tube defining a seam configured to be sandwiched between the upper housing and the lower housing;
   f) a cap defining a first compartment, a second compartment adjacent to the first compartment, and an opening to the first compartment and the second compartment, the cap comprising a barrier and a lid, the barrier configured to separate the first compartment from the second compartment, the first compartment configured to receive the head and the bristles, and the lid configured to cover the opening and the first compartment and second compartment, the lid comprising a spike configured to enter the hole of the head when the lid is placed on the cap, the cap and the lid defining an exit port when the lid is mounted on the cap;
   g) a dispenser mounted on the handle and configured to move longitudinally along the handle on the top side in a direction from the proximal end towards the distal end, wherein the dispenser comprises a slider mounted on the top side of the handle and a bumper housed inside the chamber and configured to squeeze the tube when the slider is moved from the proximal end towards the distal end;

h) a floss spool mounted in the second compartment of the cap, the floss spool configured for holding a dental floss;

i) a gasket configured to fit between the lid and the cap to create a water tight seal around the second compartment, the gasket configured to allow the dental floss to pass through the exit port;

j) a floss cutter positioned on the cap adjacent to the exit port; and k) a spacer configured to be positioned between the lid and the cap to create a distance between the lid and the cap sufficient to prevent the spike from entering the hole.

2. A combination toothbrush and toothpaste dispenser, comprising:

a) a proximal end, a distal end opposite the proximal end, a top side in between the proximal end and the distal end, and a bottom side opposite the top side and in between the proximal end and the distal end;

b) a handle at the proximal end;

c) a head operatively connected to the handle at the distal end, the handle and the head defining a chamber, wherein the head defines a hole in fluid communications with the chamber, wherein the handle and the head define a length of the toothbrush from the proximal end to the distal end;

d) a plurality of bristles projecting from the head on the top side, the bristles surrounding the hole;

e) a dispenser mounted on the handle and configured to move longitudinal along the handle in a direction from the proximal end towards the distal end, wherein the dispenser comprises a bumper housed inside the chamber;

f) a cap defining a first compartment configured to receive the head and the bristles, the cap comprising a spike projecting into the first compartment and configured to enter the hole of the head when the cap is placed on the head, wherein the cap comprises a barrier to create a second compartment adjacent to the first compartment;

g) a floss spool mounted in the second compartment, wherein the cap defines an exit port configured for extracting a dental floss;

h) a floss cutter on the cap adjacent to the exit port, wherein the cap comprises a removable lid, and the spike is mounted on the removable lid;

i) a gasket sandwiched between the removable lid and the cap to create a water tight seal around the second compartment, the gasket configured to allow the dental floss to pass through the exit port; and j) a spacer configured to be positioned between the lid and the cap to create a distance between the cap and the lid sufficient to prevent the spike from entering the hole.

3. The combination toothbrush and toothpaste dispenser of claim 2, further comprising a tube configured to extend substantially the length of the toothbrush, wherein the tube is configured to be housed in the chamber.

4. The combination toothbrush and toothpaste dispenser of claim 3, wherein the handle and the head are defined by an upper housing, and a lower housing, the upper housing removably connected to the lower housing, and wherein the tube comprises a seam along a perimeter of the tube, wherein the seam is configured to be sandwiched between the upper housing and the lower housing.

5. The combination toothbrush and toothpaste dispenser of claim 2, wherein the handle and the head are defined by an upper housing, and a lower housing, the upper housing removably connected to the lower housing, and wherein a film is attached to the lower housing along a perimeter of the lower housing.

6. The combination toothbrush and toothpaste dispenser of claim 2, wherein the handle and the head are defined by an upper housing, and a lower housing, the upper housing removably connected to the lower housing.

7. The combination toothbrush and toothpaste dispenser of claim 6, wherein the film is part of a tube defining a seam along a perimeter of the tube, wherein the seam is configured to be sandwiched between the upper housing and the lower housing.

8. The combination toothbrush and toothpaste dispenser of claim 2, wherein the top side of the handle is pliable.

* * * * *